US009734933B2

(12) United States Patent
Kim et al.

(10) Patent No.: US 9,734,933 B2
(45) Date of Patent: Aug. 15, 2017

(54) CORE MATERIAL FOR VACUUM INSULATOR, COMPRISING ORGANIC SYNTHETIC FIBER, AND VACUUM INSULATOR CONTAINING SAME

(71) Applicant: LG Hausys, Ltd., Seoul (KR)

(72) Inventors: Eun Joo Kim, Uiwang-si (KR); Seong Moon Jung, Daejeon (KR); Myung Lee, Hwaseong-si (KR); Ju Hyung Lee, Uiwang-si (KR); Hyun Jae Kim, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/782,597

(22) PCT Filed: Mar. 18, 2014

(86) PCT No.: PCT/KR2014/002252
§ 371 (c)(1),
(2) Date: Dec. 10, 2015

(87) PCT Pub. No.: WO2014/168351
PCT Pub. Date: Oct. 16, 2014

(65) Prior Publication Data

US 2016/0118158 A1 Apr. 28, 2016

(30) Foreign Application Priority Data

Apr. 8, 2013 (KR) ........................ 10-2013-0038313

(51) Int. Cl.
*F16L 59/065* (2006.01)
*H01B 3/44* (2006.01)
(Continued)

(52) U.S. Cl.
CPC ........... *H01B 3/441* (2013.01); *D04H 1/4291* (2013.01); *D04H 1/54* (2013.01); *D04H 1/56* (2013.01);
(Continued)

(58) Field of Classification Search
CPC ......... Y10T 428/231; Y10T 428/24826; F16L 59/065
See application file for complete search history.

(56) References Cited

U.S. PATENT DOCUMENTS

| | | | | |
|---|---|---|---|---|
| 9,074,716 | B2 * | 7/2015 | Nomura | F16L 59/065 |
| 2012/0114896 | A1 | 5/2012 | Jung et al. | |

FOREIGN PATENT DOCUMENTS

| | | | |
|---|---|---|---|
| EP | 0557889 | B1 | 9/1993 |
| EP | 1350869 | B1 | 10/2003 |

(Continued)

OTHER PUBLICATIONS

Extended European Search Report dated May 25, 2016 in connection with the counterpart European Patent Application No. 14782477.5-1308.

(Continued)

*Primary Examiner* — Alexander Thomas
(74) *Attorney, Agent, or Firm* — Hauptman Ham, LLP

(57) ABSTRACT

There are provided a core material for vacuum insulator comprising an organic synthetic fiber, and at least one organic synthetic fiber bonded portion; and a preparation method therefor. In addition, provided is a vacuum insulator comprising the core material for vacuum insulator comprising the organic synthetic fiber, and the at least one organic synthetic fiber bonded portion.

14 Claims, 4 Drawing Sheets

(51) Int. Cl.

| | |
|---|---|
| ***D04H 1/54*** | (2012.01) |
| ***D04H 1/4291*** | (2012.01) |
| ***D04H 1/56*** | (2006.01) |
| ***H01B 3/42*** | (2006.01) |

(52) U.S. Cl.
CPC ....... *H01B 3/421* (2013.01); *D10B 2321/022* (2013.01); *D10B 2401/00* (2013.01); *D10B 2401/04* (2013.01); *D10B 2505/00* (2013.01)

(56) References Cited

FOREIGN PATENT DOCUMENTS

| | | | |
|---|---|---|---|
| JP | 2008-057793 | A | 3/2008 |
| JP | 2008-286282 | A | 11/2008 |
| KR | 1020070023524 | A | 2/2007 |
| KR | 1020090017645 | A | 2/2009 |
| KR | 1020100131360 | A | 12/2010 |
| KR | 1020110015326 | A | 2/2011 |
| WO | 2010/073762 | A1 | 7/2010 |
| WO | 2011016694 | A2 | 2/2011 |

OTHER PUBLICATIONS

International Search Report for PCT/KR2014/002252 mailed on Jun. 26, 2014.
Taiwanese Office Action dated Oct. 26, 2015 in connection with the counterpart Taiwanese Patent Application No. 103112616.
Qinfei Ke, "Nonwovens," Donghua University Press, Sep. 30, 2004, p. 142-157, First edition.
Korean Office Action mailed on Feb. 24, 2017 for Korean Application No. 10-2013-0038313.
Chinese Office Action issued on Jan. 23, 2017 for Chinese Application No. 201480020297.6.

* cited by examiner

CORE MATERIAL FOR VACUUM INSULATOR, COMPRISING ORGANIC SYNTHETIC FIBER, AND VACUUM INSULATOR CONTAINING SAME

FIELD OF THE DISCLOSURE

The present disclosure relates to a core material for vacuum insulator comprising organic synthetic fiber, and a vacuum insulator containing the same.

BACKGROUND OF THE DISCLOSURE

A core material with a fiberglass or glass wool may be used as the core material for vacuum insulator only after the pre-treatment thereof. This is because the fiberglass and glass wool have a shape like a fiber, and when they are used as they are, they may be easily deformed by an external force, or may be slipped between the fibers. Therefore, a compression process, such as a needling process, is carried out, as well as an organic or inorganic binder is used to prevent the slipping of the fibers.

However, the organic or inorganic binder may destabilize the performance of the vacuum insulator, and certain components of gases are to be leaked to the outside from the organic or inorganic binder at the time of using with the vacuum insulator. These gases may cause to drop the degree of vacuum inside the vacuum insulator, which therefore degrades an insulation performance.

In addition, in the case of the fiberglass or glass wool, it is difficult to re-use and burn at the time of the disposal thereof, and the materials themselves weigh a lot and a large amounts of dusts may be blown in the process of manufacturing the vacuum insulator.

SUMMARY OF THE DISCLOSURE

One aspect of the present disclosure provides a core material for vacuum insulator, comprising an organic synthetic fiber having a low thermal conductivity, thereby ensuring an initial insulation performance.

Another aspect of the present disclosure provides a vacuum insulator including the core material for vacuum insulator.

According to one embodiment of the disclosure, provided is a core material for vacuum insulator, comprising: an organic synthetic fiber; and at least one organic synthetic fiber bonded portion.

In certain embodiments, the core material may not include a matrix resin, besides the organic synthetic fiber.

In certain embodiments, the organic synthetic fiber may include at least one resin selected from the group consisting of polystyrene, polyester, polypropylene, polyethylene, butadiene, styrene, and combinations thereof.

In certain embodiments, the organic synthetic fiber may have a diameter of about 20 μm or less.

In certain embodiments, the organic synthetic fiber bonded portion may be formed by welding the organic synthetic fiber.

In certain embodiments, the organic synthetic fiber bonded portion has an average diameter of about 400 μm to about 600 μm.

In certain embodiments, a distance between a center of the organic synthetic fiber bonded portion and a center of another adjacent organic synthetic fiber bonded portion may be about 750 μm to about 1100 μm.

In certain embodiments, the core material for vacuum insulator may include an organic synthetic fiber arranged horizontally.

In certain embodiments, the organic synthetic fiber arranged horizontally may include a longitudinal or transverse arrangement.

In certain embodiments, the core material for vacuum insulator may have a thickness of about 100 μm to about 200 μm.

In certain embodiments, the core material for vacuum insulator may be a single or a plurality of laminated structure.

In certain embodiments, the laminated core material for vacuum insulator may have a weight per unit area of about 40 $g/m^2$ or less.

In certain embodiments, the laminated core material for vacuum insulator may have a porosity of about 60% to about 80%.

According to another embodiment of the disclosure, provided is a process for preparing a core material for vacuum insulator, comprising: providing an organic synthetic fiber; spinning the organic synthetic fiber in paper form; and locally heat pressing the spinned organic synthetic fiber to form an organic synthetic fiber bonded portion.

According to still another embodiment of the disclosure, provided is a vacuum insulator, comprising the core material for vacuum insulator.

The core material for vacuum insulator in accordance with some embodiments of the present disclosure can maintain an initial heat insulation performance, and can solve hazardous issues on the human body.

Further, the vacuum insulator comprising the core material for vacuum insulator in accordance with some embodiments of the present disclosure can prevent the degradation of the insulation performance of the core material caused by the matrix resin.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE EMBODIMENTS

Figure 1:
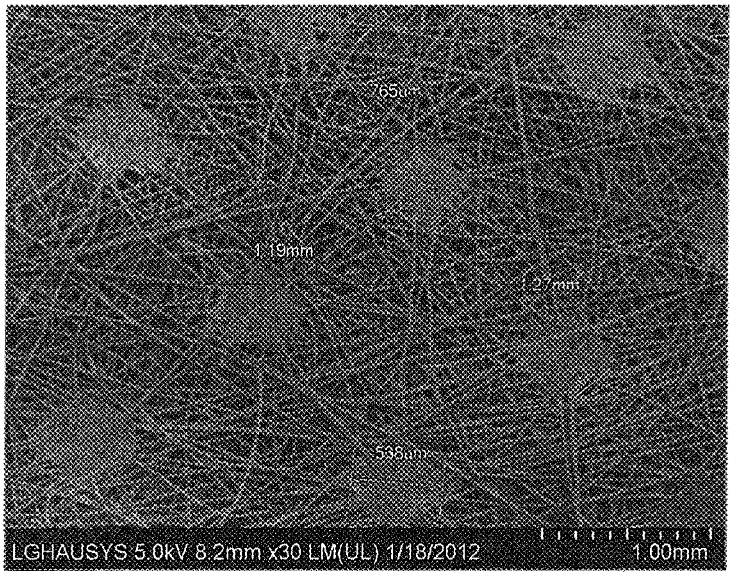
FIG. 1 shows an SEM image of the plan view taken from a core material for vacuum insulator.

The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully covey the concept of the invention to those skilled in the art, and the present disclosure will only be defined by the appended claims. Like reference numerals designate like elements throughout the specification.

In the following detailed description, only certain exemplary embodiments of a core material for vacuum insulator and a vacuum insulator comprising the same according to the present disclosure have been shown and described, simply by way of illustration, with reference to the accompanying drawings.

Core Material for Vacuum Insulator and a Method for Preparation Thereof

In one embodiment of the present disclosure, there is provided a core material for vacuum insulator, comprising: an organic synthetic fiber; and at least one organic synthetic fiber bonded portion.

A conventional vacuum insulator may be prepared by inserting a core material consisting of a fiberglass or fumed silica into an outer cover material comprising an aluminum foil or an outer cover material comprising a metal deposition film, attaching a getter material to the core material, and then evacuating under vacuum. Further, a conventional fiberglass has a thermal conductivity of about 7 to about 10 times higher than that of the organic synthetic fiberglass. In this case, when compared with only the heat transfer performance of the material itself, the core material using the fiberglass may have a much higher insulation performance.

However, the use of the core material for vacuum insulator comprising a fiberglass having a certain lower level of diameter, e.g., about 4 μm or less, is strongly regulated for the reason of hazardousness to human body. In addition, when using a normalized fiberglass having a certain level of diameter, e.g., 4 μm or more, as a core material, a separate treatment with a matrix resin is required, which may, however, cause a thermal deterioration.

Thus, the core material for vacuum insulator merely includes an organic synthetic fiber which has a significantly lower intrinsic thermal conductivity at a level of 1/10 compared to inorganics, such as glass, and thereby the hazard problem to the human body during processing into the form of a fiber comprising at least one organic synthetic fiber bonded portion can be solved, and an excellent insulation performance can also be obtained.

The core material for vacuum insulator may merely be formed of the organic synthetic fiber, and in addition to the organic synthetic fiber, it does not further include a matrix resin. The core material for vacuum insulator may be prepared by heat sealing the organic synthetic fiber having a uniform length and diameter, and even though the core material do not further include a separate matrix resin, the core material can secure the performance of the vacuum insulator, and the degree of vacuum inside the vacuum insulator can be maintained at a certain level without the leakage of gas from the matrix resin.

The organic synthetic fiber may be prepared by producing a polymer compound using a small molecule, such as petroleum, coal, limestone, etc., and spinning the polymer compound, and may include at least one resin selected from the group consisting of polystyrene, polyester, polypropylene, polyethylene, butadiene, styrene, and combinations thereof, but not limited thereto. Particularly, the organic synthetic fiber comprising a polypropylene resin, which is relatively inexpensive and provides an easy supply based on its unit weight, has a high degree of utilization.

The organic synthetic fiber may have a diameter in the range of about 20 μm or less, specifically, about 10 μm to about 20 μm. By the use of the organic synthetic fiber having a diameter within these ranges, the harmfulness to the human body can be avoided, and since typically the higher the porosity of the core material for vacuum insulator becomes, the insulation performance is excellent, the organic synthetic fiber having a diameter in the above described range can secure a porosity higher than a certain level.

Further, when the core material for vacuum insulator includes a fiberglass, although typically the smaller the diameter of the fiberglass becomes, the insulation performance gets exerted, since the core material for vacuum insulator is merely formed by the organic synthetic fiber, the core material for vacuum insulator comprising the organic synthetic fiber having a diameter in the above range can secure a certain level of the thermal conductivity, and thereby the initial performance of the vacuum insulator can easily be maintained.

For example, the organic synthetic fiber may have a length in the range of about 2 mm or more, or about 3 mm or more. When the core material in the form of a fiber is applied to the vacuum insulator, it is advantageous for the arrangement of the fiber to keep a horizontal direction. However, the more the fibers in a vertical arrangement are, the heat transfer occurs in the vertical direction, which makes the insulation performance poor.

Therefore, the use of the organic synthetic fiber having a length in the range of about 2 mm or more, or about 3 mm or more minimizes the number of the synthetic fibers in the vertical arrangement, which gives a beneficial effect in terms of achieving the thermal conductivity of the vacuum insulator.

The core material for vacuum insulator may include a synthetic organic fiber bonded portion. The organic synthetic fiber bonded portion is formed by welding the organic synthetic fibers, for example, by spinning the organic synthetic fiber in a paper form, and compressing the spinned organic synthetic fiber with an embossed roller to thereby heat-seal the fibers to each other, such that the organic synthetic fibers may be melted by the heat to form the bonded portion.

Specifically, the organic synthetic fiber bonded portion may have one or more parts of the organic synthetic bonded portion, and may be formed in a polygon shape by the heat-sealing. For example, such polygon may include a circle, an oval, a triangle, a square, and the like, but not limited thereto.

Figure 2:
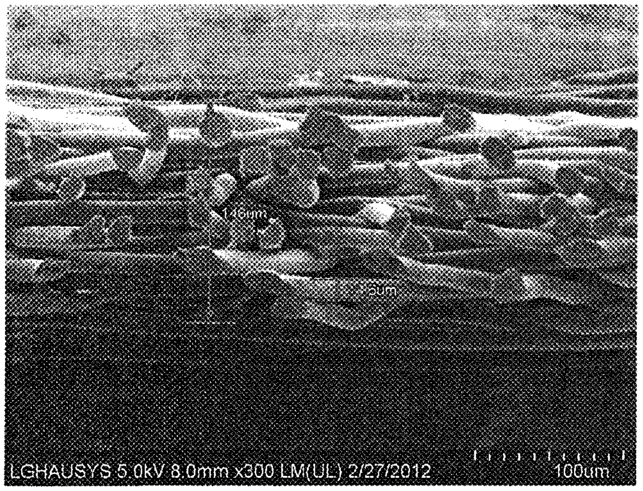
FIG. 2 shows an SEM image of the cross sectional view taken from an organic synthetic fiber in a core material for vacuum insulator.
Figure 3:
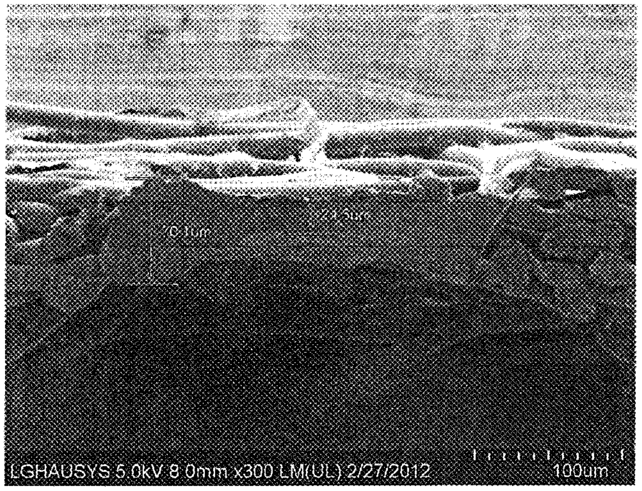
FIG. 3 shows an SEM image of the cross sectional view taken from an organic synthetic fiber bonded portion in a core material for vacuum insulator.

FIG. 1 shows an SEM image of the plan view taken from the core material for vacuum insulator. The core material for vacuum insulator includes, in addition to a uniformly arranged and spinned organic synthetic fiber, at least one organic synthetic fiber bonded portion formed of the heat sealed organic synthetic fiber. Specifically, FIG. 2 shows an SEM image of the cross sectional view taken from the organic synthetic fiber in the core material for vacuum insulator, and FIG. 3 shows an SEM image of the cross sectional view taken from the organic synthetic fiber bonded portion in the core material for vacuum insulator.

The organic synthetic fiber boned portion may have an average diameter of about 400 μm to about 600 μm. The average diameter is meant by the diameter where the bonded portion is a circular one, but when the bonded portion is a non-circular polygon, it is meant by the average value of the diameters measured in different opposite parts. The shape of the core material for vacuum insulator comprising the organic synthetic fiber bonded portion can be maintained by keeping the average diameter within these ranges, and the core material for vacuum insulator can have a certain pore size to ensure an excellent insulation performance for vacuum insulator.

In addition, the distance between a center of the organic synthetic fiber bonded portion and another center thereof may be about 750 μm to about 1100 μm. When the organic synthetic fiber bonded portion is polygon, for example, the distance between a center of the organic synthetic fiber bonded portion and another center thereof may be a distance between the center of one organic synthetic fiber bonded portion and the center of another organic synthetic fiber bonded portion.

The organic synthetic fiber bonded portion may be at least one bonded portion spaced apart by a predetermined distance. The distance between the centers of the above described ranges may be maintained and a certain number of the organic synthetic fiber bonded portion per unit area may be included to thereby maintain the shape of the core material for vacuum insulator.

Figure 4:
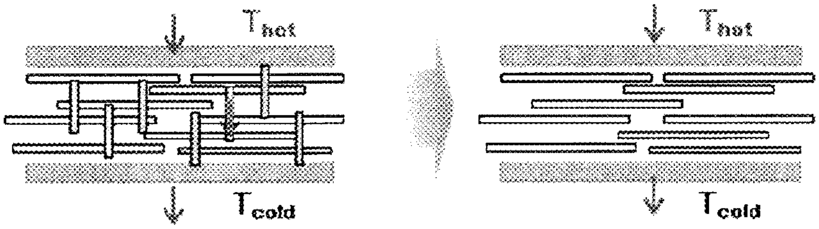
FIG. 4 schematically shows an organic synthetic fiber arranged horizontally.

The core material for vacuum insulator may include the organic synthetic fiber arranged in a horizontal direction. FIG. 4 schematically shows the organic synthetic fiber arranged horizontally. Referring to FIG. 4, when the heat transfer direction is a vertical direction from $T_{hot}$ to $T_{cold}$, and the core material for vacuum insulator include the organic synthetic fiber bonded portion arranged in a vertical direction, the heat transfer in the core material will increase. However, when the core material for vacuum insulator includes the organic synthetic fiber bonded portion arranged in a horizontal direction, even though the heat transfer direction is in a vertical direction, the insulation performance in the core material can be maintained.

As the arrangement of the organic synthetic fiber may be closer to a horizontal state, the insulation performance of the core material becomes excellent, and when the core material for vacuum insulator includes the organic synthetic fiber having a predetermined length as described above, the organic synthetic fibers arranged in a vertical direction do not barely exist, and thereby the heat transfer in the vertical direction is decreased, and rather the heat transfer in a horizontal direction can be activated.

In particular, the organic synthetic fiber arranged in a horizontal direction may include a longitudinal arrangement or a transverse arrangement. In a plane, the longitudinal arrangement and the transverse arrangement may be alternately arranged. A separate matrix resin may be included between the organic synthetic fibers. Therefore, the organic synthetic fibers formed by spinning them in the form of fiber may be uniformly arranged.

The core material for vacuum insulator may have a thickness in the range of about 100 μm to about 200 μm. Within this range, the physical durability by an external pressure, etc. can be obtained, and in the process of evacuating the core material inserted into the vacuum insulator, a certain degree of vacuum can be maintained. Further, within this range, the vacuum insulator can improve the production efficiency, the initial insulation performance, and the long term durability.

The core material for vacuum insulator may be laminated to one or more layers. It is possible to adjust the thickness of the core material for vacuum insulator based on the number of laminates. The core material for vacuum insulator may have a weight per unit area of about 40 $g/m^2$ or less, and specifically about 20 $g/m^2$ or less. As used herein, the weight per unit area is referred to as a weight per unit area measured per one square meter (1 $m^2$) for the core material. A constant level of the weight per unit area may be obtained by laminating the core materials for vacuum insulator to control the density and porosity of the core material for vacuum insulator.

Lower limits in the weight per unit area of the laminated core material for vacuum insulator are not defined. Within these weight ranges, a certain level of insulation performance can be achieved. However, if the weight per unit area exceeds about 40 $g/m^2$, the contact between the organic synthetic fibers may increase, and the thermal conductivity by the contact may also increase, and thereby the insulation performance of the vacuum insulator may be degraded.

Specifically, when the weight per unit area of the core material for vacuum insulator is less than about 10 $g/m^2$, the pore size in the core material for vacuum insulator may be larger, and thereby the insulation performance of the vacuum insulator comprising the core material for the vacuum insulator may be reduced.

In addition, the porosity of the laminated core material for vacuum insulator may be about 60% to about 80%. The porosity is a value indicating the degree of void of the laminated core material for vacuum insulator, which means the percentage of the pore volume relative to the entire volume of the laminated vacuum insulator. A certain level of porosity can be secured by laminating the core materials for vacuum insulator comprising having a predetermined diameter, and controlling the density and the weight per unit area.

In another embodiment of the present disclosure, a process for preparing a core material for vacuum insulator, comprising: providing an organic synthetic fiber; spinning the organic synthetic fiber in paper form; and locally heat pressing the spinned organic synthetic fiber to form an organic synthetic fiber bonded portion.

The organic synthetic fiber may be prepared by forming in the form of fiber at least one resin selected from the group consisting of polystyrene, polyester, polypropylene, polyethylene, butadiene, styrene, and combinations thereof. Then, the prepared organic synthetic fiber may be spinned in paper form.

Further, the core material for vacuum insulator may not further contain other matrix resin, besides the organic synthetic fiber. For this reason, adherence between the organic synthetic fibers may be reduced, and thereby the present process can further include locally heat pressing the spinned organic synthetic fiber to form the organic synthetic fiber bonded portion.

The core material for vacuum insulator can be prepared merely from the organic synthetic fiber, even without containing the matrix resin due to the organic synthetic fiber bonded portion, and thereby the production process and manufacturing costs can be minimized.

Vacuum Insulator

In another embodiment of the present disclosure, there is provided a vacuum insulator, comprising the core material for vacuum insulator comprising an organic synthetic fiber and at least one organic synthetic fiber bonded portion.

The vacuum insulator may be formed by comprising the core material for the vacuum insulator and an outer cover material wrapping the core material for vacuum insulator under vacuum, and further comprising a getter material attached to or inserted into the core material for vacuum insulator.

The outer cover material accommodating the core material for vacuum insulator under pressure may sequentially have a metal barrier layer and a surface proactive layer formed on an adhesive layer. This can ensure for the vacuum insulator to have the best air tightness and long term durability. Further, gas and moisture may also be generated inside the outer cover material due to the temperature change outside the vacuum insulator. Therefore, the getter material can be used to prevent the generation of the gas and moisture.

In this embodiment, calcium oxide (CaO) contained in a pouch may be used as the getter material, and particularly calcium oxide having a purity of 95% or more. The pouch may be formed from a non-woven fabric in which wrinkled paper and polypropylene (PP) may be impregnated, such that the moisture absorbing performance of 25% or more can be achieved. Further, considering the thickness of the whole vacuum insulator, the getter material may be formed having a thickness of about 2 mm or less.

Hereinafter, the present disclosure will be described in more detail with reference to some specific examples thereof. However, the following examples are provided for illustration only and are not to be construed as limiting the present disclosure in any way.

EXAMPLES AND COMPARATIVE EXAMPLES

Example 1

A core material comprising at least one PP fiber bonded portion (average diameter of the bonded portion was 538 μm, and the distance between the center of the bonded portion and another center of the bonded portion was 1,034 μm) was prepared by spinning a polypropylene (PP) long fiber having a fiber diameter of about 10 μm to about 15 μm, and a length of 2 mm to 3 mm, without matrix resin, and compressing the spinned PP fiber with an embossed roller. The core material was dried at 70° C. for 24 hours, and 100 pieces of the core material were laminated to form a core material for vacuum insulator having a weight per unit area of 15 g/m$^2$.

Then, 20 g of calcium oxide having a purity of 95% was put into a pouch to prepare a getter material, and the getter material was inserted into the core material. Then, the core material for vacuum insulator was inserted into an outer cover material under vacuum which is formed of, sequentially from the top, polyethylene terephthalate film (PET) 12.5 μm, nylon film 25 μm, Al foil 6 μm, and a linear low density polyethylene (LLDPE) film 50 μm (Koptri-113643-1, LG Hausys, Ltd.). Then, the outer cover material was pressure-sealed under vacuum to give a vacuum insulator having a dimension of 190 mm×250 mm×10 mm (thickness×width×length).

At this time, the thermal conductivity was measured using HC-074-200 equipment (commercially available from EKO Corp.). The results were summarized in Table 1 below.

Example 2

A vacuum insulator was prepared in the same way as Example 1, except that 80 pieces of core materials were laminated to form the core material having a weight per unit area of 20 g/m$^2$.

Example 2-1

A vacuum insulator was prepared in the same way as Example 2, except that the core material was dried at 70° C. for 1 hour.

Example 2-2

A vacuum insulator was prepared in the same way as Example 2, except that the core material was dried at 120° C. for 24 hours.

Example 2-3

A vacuum insulator was prepared in the same way as Example 2, except that the core material was dried and spinned at 120° C. for 1 hour.

Example 3

A vacuum insulator was prepared in the same way as Example 1, except that 40 pieces of core materials were laminated to form the core material having a weight per unit area of 40 g/m$^2$.

Comparative Example 1

A vacuum insulator was prepared in the same way as Example 1, except that plate-shaped boards formed by a fiberglass aggregate having an average diameter of 5 μm and an inorganic binder comprising silica were laminated one by one to form a complex core material, and cut into a dimension of 12 mm×430 mm×912 mm (thickness×width×length) to give the vacuum insulator.

Comparative Example 2

A vacuum insulator was prepared in the same way as Example 1, except that a core material having a dimension of 10 mm×600 mm×600 mm (thickness×width×length) was prepared by a wet-process using a glass wool and an inorganic binder to give the vacuum insulator.

TABLE 1

| | EX. 1 | EX. 2 | EX. 3 |
|---|---|---|---|
| Core component | PP fiber | PP fiber | PP fiber |
| Core thickness (μm) | 100 | 150 | 200 |
| Weight per unit area of core material | 15 | 20 | 40 |
| Thermal conductivity (mW/mK) | 4.025 | 4.131 | 4.897 |

TABLE 2

| | C. EX. 1 | C. EX. 2 |
|---|---|---|
| Core component | Fiberglass aggregate and silica inorganic binder | Glass wool and inorganic binder |
| Thermal conductivity (mW/mK) | 4.032 | 3.598 |

Referring to Tables 1 and 2, it has been found that the thermal conductivity of the core material for vacuum insulator comprising an organic synthetic fiber, was measured similarly compared to Comparative Example 1 using the fiberglass aggregate and the inorganic binder comprising silica as a core material, and Comparative Example 2 using the glass wool and the inorganic binder as a core material for vacuum insulator. Thus, it can be appreciated that a certain level of thermal conductivity can be obtained even when the core material was formed only of an organic synthetic fiber, without containing a separate matrix resin.

Specifically, in the case of Examples 1 to 3, although the core material for vacuum insulator was composed only of the organic synthetic fiber having the same diameter and length, the weight per unit area can be controlled based on the density and porosity. As the weight per unit area is increased, the higher the density of the own core material for vacuum insulator becomes, and the porosity is reduced, and thereby the heat conduction through the core material for vacuum insulator formed only of the organic synthetic fiber increases. Therefore, Examples 1 to 3 suggested that the greater the weight per unit area becomes, the greater the thermal conductivity increases.

TABLE 3

| | EX. 2 | EX. 2-1 | EX. 2-2 | EX. 2-3 |
|---|---|---|---|---|
| Core material | PP fiber (unit weight 20 g/$m^2$) | | | |
| Dry time | 24 hrs | 1 hr | 24 hrs | 1 hr |
| Dry temperature | 70° C. | 70° C. | 120° C. | 120° C. |
| Thermal conductivity | 4.311 | 4.054 | 3.981 | 4.084 |

In addition, Examples 2 to 2-3 were configured according to a pre-treatment of the core material. At this time, the thermal conductivity was measured, and the results were summarized in Table 3. In the process of manufacturing a core material for vacuum insulator only comprising an organic synthetic fiber, the pre-treatment of the core material was required to remove initial moisture and impurities. Therefore, for an organic synthetic fiber having a relatively low melting point, the pre-treatment temperature can be limited below the melting point.

Thus, even when the dry time and dry temperature in the pre-treatment of the core material as shown in Examples 2 to 2-3 varied, the core material showed a certain level or higher thermal conductivity. Therefore, it was confirmed that even when the core material for vacuum insulator formed only of the organic synthetic fiber was used, the superior insulation performance can be achieved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the scope of the present disclosure shall be determined only according to the attached claims.

The invention claimed is:

1. A core material for vacuum insulator, comprising:
- an organic synthetic fiber, wherein the organic synthetic fiber has a length of 2 millimeters (mm) to 3 mm; and
- a plurality of organic synthetic fiber bonded portions,
  - wherein each organic synthetic fiber bonded portion of the plurality of organic synthetic fiber bonded portions has an average diameter of about 400 micrometers (μm) to about 600 μm, and
  - wherein a distance between a center of each synthetic fiber bonded portion of the plurality of organic synthetic fiber bonded portions and a center of an adjacent organic synthetic fiber bonded portion of the plurality of organic synthetic fiber bonded portions ranges from about 750 μm to about 1100 μm.

2. The core material for vacuum insulator according to claim 1, which does not comprise a matrix resin, besides the organic synthetic fiber.

3. The core material for vacuum insulator according to claim 1, wherein the organic synthetic fiber comprises at least one resin selected from the group consisting of polystyrene, polyester, polypropylene, polyethylene, butadiene, styrene, and combinations thereof.

4. The core material for vacuum insulator according to claim 1, wherein the organic synthetic fiber has a diameter of about 20 μm or less.

5. The core material for vacuum insulator according to claim 1, wherein the plurality of organic synthetic fiber bonded portions is formed by welding of the organic synthetic fiber.

6. The core material for vacuum insulator according to claim 1, wherein the core material for vacuum insulator includes an organic synthetic fiber arranged horizontally.

7. The core material for vacuum insulator according to claim 6, wherein the organic synthetic fiber arranged horizontally includes a longitudinal or transverse arrangement.

8. The core material for vacuum insulator according to claim 1, wherein the core material for vacuum insulator has a thickness of about 100 μm to about 200 μm.

9. The core material for vacuum insulator according to claim 1, wherein the core material for vacuum insulator is a single or a plurality of laminated structure.

10. The core material for vacuum insulator according to claim 9, wherein the laminated core material for vacuum insulator has a weight per unit area of about 40 g/$m^2$ or less.

11. The core material for vacuum insulator according to claim 9, wherein the laminated core material for vacuum insulator has a porosity of about 60% to about 80%.

12. A vacuum insulator comprising the core material for vacuum insulator defined in claim 1.

13. The core material for vacuum insulator according to claim 1, wherein each organic synthetic fiber bonded portion of the plurality of organic synthetic fiber bonded portions has an average diameter of about 538 μm to about 600 μm, and wherein a distance between a center of each synthetic fiber bonded portion of the plurality of organic synthetic fiber bonded portions and a center of an adjacent organic synthetic fiber bonded portion of the plurality of organic synthetic fiber bonded portions ranges from about 750 μm to about 1034 μm.

14. A process for preparing a core material for vacuum insulator, comprising:
- providing an organic synthetic fiber, wherein the organic synthetic fiber has a length of 2 millimeters (mm) to 3 mm;
- spinning the organic synthetic fiber in paper form; and
- locally heat pressing the spinned organic synthetic fiber to form a plurality of organic synthetic fiber bonded portions,
  - wherein each organic synthetic fiber bonded portion of the plurality of organic synthetic fiber bonded portions has an average diameter of about 400 micrometer (μm) to about 600 μm, and
  - wherein a distance between a center of each synthetic fiber bonded portion of the plurality of organic synthetic fiber bonded portions and a center of an adjacent organic synthetic fiber bonded portion of the plurality of organic synthetic fiber bonded portions ranges from about 750 μm to about 1100 μm.

* * * * *